US012710735B2

(12) United States Patent
Roesch

(10) Patent No.: US 12,710,735 B2
(45) Date of Patent: Aug. 18, 2026

(54) METHOD FOR CONTROLLING AN INDUSTRIAL PLANT

(71) Applicant: Schneider Electric Industries SAS, Rueil-Malmaison (FR)

(72) Inventor: Ulrich Roesch, Triefenstein (DE)

(73) Assignee: Schneider Electric Industries SAS, Rueil-Malmaison (FR)

(*) Notice: Subject to any disclaimer, the term of this patent is extended or adjusted under 35 U.S.C. 154(b) by 380 days.

(21) Appl. No.: 18/173,135

(22) Filed: Feb. 23, 2023

(65) Prior Publication Data

US 2023/0266734 A1 Aug. 24, 2023

(51) Int. Cl.
*G05B 19/05* (2006.01)
*G06F 9/455* (2018.01)

(52) U.S. Cl.
CPC ....... *G05B 19/054* (2013.01); *G06F 9/45558* (2013.01); *G06F 2009/45562* (2013.01)

(58) Field of Classification Search
None
See application file for complete search history.

(56) References Cited

U.S. PATENT DOCUMENTS 11,188,376 B1 * 11/2021 Alexander .......... G06F 9/45558
11,783,062 B2 * 10/2023 Lounsberry ......... G06F 21/6218 726/30
2009/0300607 A1 * 12/2009 Ferris .................. G06F 9/45558 718/1
2012/0096271 A1 * 4/2012 Ramarathinam ..... H04L 63/168 709/227
2012/0265976 A1 10/2012 Spiers et al.
2012/0266167 A1 10/2012 Spiers et al.
2012/0266213 A1 10/2012 Spiers et al.
2012/0266231 A1 * 10/2012 Spiers ................ G06F 9/45533 726/12
2012/0266252 A1 * 10/2012 Spiers .................. H04L 9/3247 726/26

(Continued)

FOREIGN PATENT DOCUMENTS

| | | | |
|---|---|---|---|
| CN | 210038519 | U | 2/2020 |
| EP | 3 770 704 | A1 | 1/2021 |
| WO | WO 2015/034458 | A1 | 3/2015 |

OTHER PUBLICATIONS

Office Action issued Dec. 11, 2024, in corresponding European Patent Application No. 22 305 208.5, 8 pages.

(Continued)

*Primary Examiner* — Hua Lu
(74) *Attorney, Agent, or Firm* — Oblon, McClelland, Maier & Neustadt, L.L.P.

(57) ABSTRACT

A method serves to control an industrial plant comprising a programmable logic controller. In the method, the programmable logic controller establishes a connection with a cloud server, the programmable logic controller executes a software module that causes the creation and/or configuration of a virtual machine on the cloud server, the software module receives and stores an access token, the programmable logic controller uses the access token to access the virtual machine and the programmable logic controller cooperates with the virtual machine to transmit process data to the virtual machine and/or to support the control of the industrial plant.

10 Claims, 1 Drawing Sheet

(56) References Cited

U.S. PATENT DOCUMENTS

2014/0298439 A1 10/2014 Spiers et al.
2014/0331309 A1 11/2014 Spiers et al.
2015/0350188 A1* 12/2015 Gilpin .................... G06F 21/53 726/9
2016/0094543 A1 3/2016 Innes et al.
2016/0094546 A1 3/2016 Innes et al.
2016/0197778 A1* 7/2016 Jones .................. G05B 19/056 709/222
2017/0104826 A1* 4/2017 Sait ................. G05B 19/41855
2017/0289191 A1* 10/2017 Thioux ............... H04L 63/1441
2019/0056970 A1* 2/2019 Graf ...................... G06F 9/5055
2019/0068373 A1* 2/2019 Konduru ............ H04L 63/0853
2019/0230081 A1* 7/2019 Singh ...................... H04L 63/10
2019/0286813 A1* 9/2019 Lounsberry ........... H04L 9/0894
2019/0296912 A1 9/2019 Konduru
2020/0358656 A1* 11/2020 Klein .................. H04L 41/0806
2020/0358777 A1* 11/2020 Threlkeld ............. H04L 9/0643
2021/0224091 A1* 7/2021 Hayatnagarkar ... G06F 9/44505
2021/0344670 A1* 11/2021 Dachev ............... H04L 63/0846
2021/0377018 A1* 12/2021 Lawrence ........ G05B 19/41835
2021/0392142 A1* 12/2021 Stephens ............... H04L 63/104
2022/0006631 A1 1/2022 Konduru
2023/0239301 A1* 7/2023 Ivanov ................. H04L 63/102 726/1

OTHER PUBLICATIONS

Extended European Search Report Issued Aug. 17, 2022 in European Application 22305208.5, (with English translation of categories of cited documents), 10 pages.

* cited by examiner

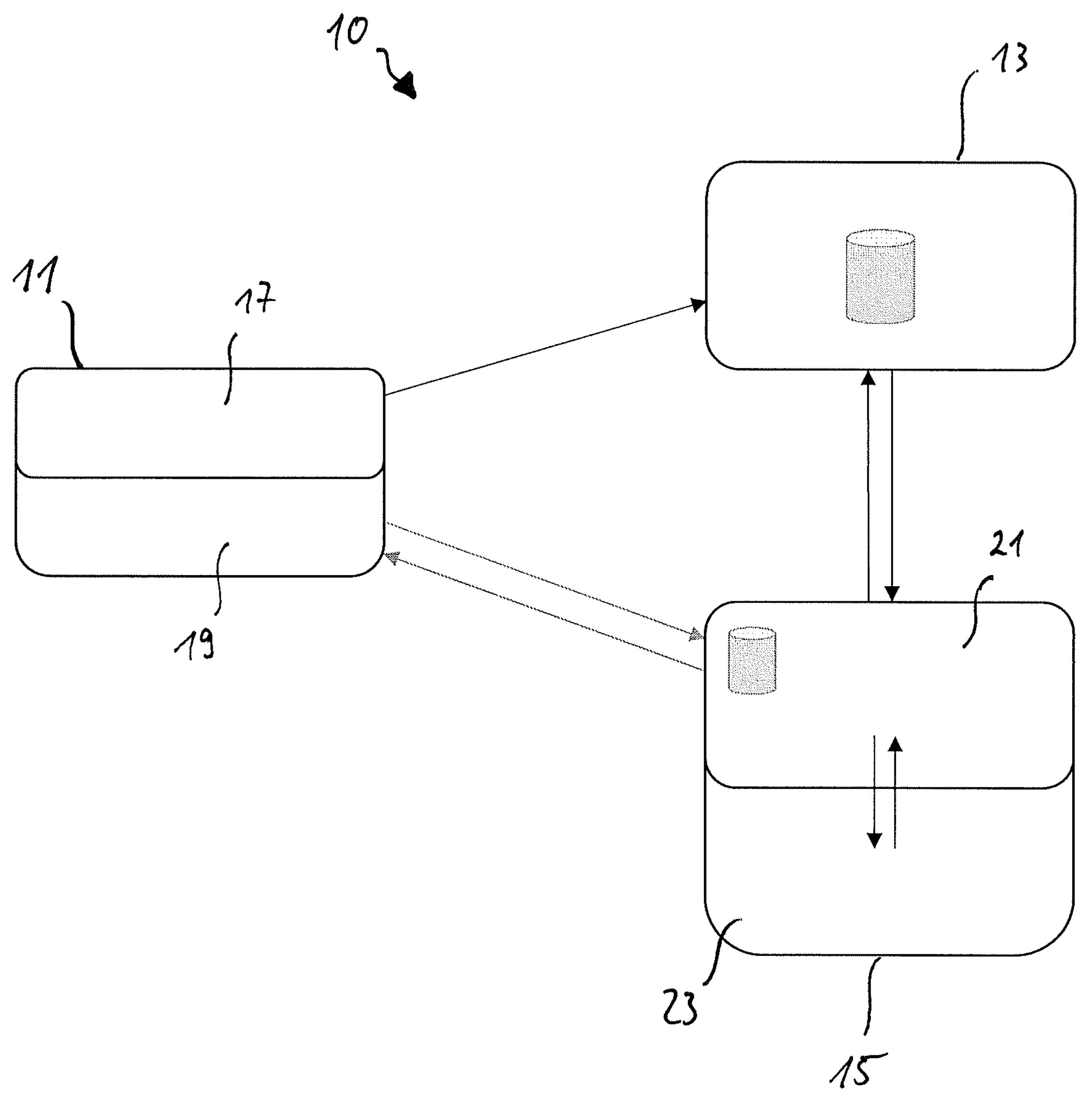
10
13
11
17
21
19
23
15

METHOD FOR CONTROLLING AN INDUSTRIAL PLANT

The invention relates to a method for controlling an industrial plant that has a programmable logic controller and that is connected via the latter to a cloud server.

Manual work is required to create and configure a virtual machine in a cloud and to connect the programmable logic controller to the virtual machine since the virtual machine has to be created and configured in the cloud.

These processes are complex, error-prone, and impractical in particular when the cloud server is networked with a plurality of industrial plants in different locations around the world.

It is therefore an object of the present invention to simplify the creation and configuration of a virtual machine and to it make more efficient.

This object is satisfied by a method in accordance with claim 1 and by a system in accordance with claim 10. Advantageous further developments of the method are the subject of the dependent claims.

The method in accordance with the invention serves to control an industrial plant that has at least one programmable logic controller, abbreviated to "PLC". In the method,

- the programmable logic controller establishes a connection with a cloud server,
- the programmable logic controller executes a software module that causes the creation and/or configuration of a virtual machine on the cloud server,
- the software module receives an access token and stores it,
- the programmable logic controller uses the access token to access the virtual machine, and
- the programmable logic controller cooperates with the virtual machine to transmit process data to the virtual machine and/or to support the control of the industrial plant.

The programmable logic controller, abbreviated to "PLC", can, for example, transmit plant data, in particular performance data, about the industrial plant to the cloud.

In principle, the industrial plant can also be designated as a physical machine, with the virtual machine (VM) being associated with the industrial plant or the physical machine. The cloud server can in particular be connected to the programmable logic controllers of many different industrial plants, at least some of which can be located in different locations around the world. The connection of the programmable logic controller to the cloud server then takes place via the Internet.

For example, the method is suitable for the operation of a cloud server by a plant manufacturer and/or a service provider who retrieves and monitors performance data about the various plants or provides maintenance services via the cloud server.

In accordance with the invention, the creation of the virtual machine in the cloud thus takes place automatically by the software module, which can in particular be based on the IEC-61131 standard, without the virtual machine having to be manually created and/or configured. The software module can be included in a software library (e.g. a library file) so that the execution of the software is greatly simplified since the IEC-61131 standard is a standard for programmable logic controllers.

Furthermore, the access token, in particular from the cloud server, is automatically transmitted to the programmable logic controller and stored therein by the software module. The creation on the cloud server and the manual transfer of the access token to the industrial plant or the programmable logic controller are thus dispensed with. The access token can in particular be an SAS token ("Shared Access Signature") that has the purpose of documenting an access authorization of the programmable logic controller and the scope of the access authorization. Access of the programmable logic controller to the virtual machine can therefore be effected with the access token so that the programmable logic controller can provide data, for example performance data, to the virtual machine and/or can retrieve data therefrom.

The programmable logic controller cooperates with the virtual machine via the connection to transmit process data to the virtual machine and/or to support the control of the industrial plant control. For this purpose, the virtual machine can, for example, take over computationally expensive or memory-intensive tasks from the programmable logic controller. The control of the industrial plant can thereby be improved. Furthermore, the control of the industrial plant can, for example, be influenced as part of maintenance via remote diagnosis based on the performance data.

The cloud server preferably has a cloud for the virtual machine and a management unit that communicate with one another in a protected manner and that are connected in the sense that they are either two separate units, which are, however, connected to one another and communicate via the Internet, or are physically provided in a single unit. In the cloud, the virtual machine is stored together with associated performance data that can in particular be provided with a time feature (time stamp) to be able to assign the performance data to a specific point in time.

The management unit is preferably provided with an API (application programming interface) that can be accessed via an API endpoint, for example, by means of http and GraphQI requests and mutations or by means of REST (RESTful API); however, the use of another API is also conceivable.

The management unit can, for example, serve to manage the data stored in the cloud, including the performance data, by means of a client and, if applicable, via the API to access said data and to visualize the data in a user interface of the client.

Furthermore, the management unit can initiate the creation and configuration of the virtual machine. For this purpose, the management unit can communicate with the cloud and the programmable logic controller. The management unit can in particular receive the request from the programmable logic controller to create a virtual machine for the programmable logic controller. The programmable logic controller can in so doing communicate at least a basic configuration and/or basic requirements for the virtual machine to be created to the management unit. For example, the basic request can comprise the access configuration required for the virtual machine, a selected representation form of machine data, computing power required for the virtual machine, and/or the computational task intended for the virtual machine. In particular, based on the basic configuration and/or the basic requirements, all the configuration parameters required for creating the virtual machine can then be generated in the management unit, in particular automatically, or can be defined via a client by a user at the management unit. The management unit can therefore supplement the basic configuration and/or the base configuration such that the virtual machine can be created with all the required configuration parameters. Furthermore, the management unit can generate the access token and transmit it to the programmable logic controller and/or to the cloud, i.e. to the newly created virtual machine. The management unit can thus also relieve the programmable logic controller of tasks which, from the point of view of the programmable logic controller, thus take place in the background.

The software module and/or the management unit can create the virtual machine on the cloud server. The virtual machine is preferably configured during the creation, wherein the configuration parameters required for the configuration, as mentioned above, are provided by the programmable logic controller and/or by the management unit. For example, they can be set via a client connected to the programmable logic controller or to the management unit or they can already be stored in advance, at least in part, in the industrial plant or in the programmable logic controller. For example, as part of the putting into operation, a user can log in to the programmable logic controller via a client and can inform the programmable logic controller as to whether the virtual machine should be fully automatically created by the programmable logic controller. In addition, it can be possible to communicate via the client whether the creation should be partly outsourced to the management unit or whether certain configuration parameters should be obtained from the management unit.

In an advantageous embodiment, the management unit communicates the access token to the programmable logic controller and/or the virtual machine. The access token can in particular be generated by the management unit and can then be automatically transmitted via the Internet to the programmable logic controller and/or the virtual machine for storage. The process takes place fully automatically and avoids errors. For example, the communication of the access token by the management unit can take place at the request of the programmable logic controller.

The access token is preferably received and stored repeatedly, in particular regularly. This process can, for example, be triggered at certain time intervals in that, for instance, the programmable logic controller sends a request to the management unit in a time-controlled manner to initiate the generation and transmission of a new access token to the programmable logic controller. Alternatively, the generation and transmission of the access token can be performed automatically and autonomously, i.e. without a respective request of the programmable logic controller, at the management unit. The management unit then generates a new access token in each case for the programmable logic controller and communicates it to the programmable logic controller and/or the virtual machine. This allows the validity period of the access token to be significantly reduced since the process of renewing the access token is automated and is thus considerably simplified. The reduction of the validity period, in turn, has a positive effect on safety.

The communication between the programmable logic controller and the cloud server and the connection to the API of the management unit preferably take place in encrypted form. TLS ("Transport Layer Security") can in particular be suitable for the encryption of the communication. With the so-called TLS handshake, an exchange of certificates between the programmable logic controller and the cloud server can take place when establishing the connection in order to verify the identity of the respective other communication partner. This step is generally optional, but can also be mandatory for establishing the connection if one of the components requires a certificate for this purpose. The communication is, for example, based on HTTPS, wherein X.509 certificates can be used.

To secure the communication, in particular with the management unit, the programmable logic controller can also be assigned a bearer token. The bearer token is, for example, stored during the putting into operation of the industrial plant or of the programmable logic controller. The purpose of the bearer token is that the programmable logic controller can authenticate itself to the management unit during repeated connections and can e.g. only access the data relevant to it in the management unit. When renewing the access token, the management unit can thus easily establish an encrypted connection with the programmable logic controller and/or can ensure that the access token is transmitted to the correct programmable logic controller. It is usually sufficient to generate the bearer token once.

A further subject of the invention is a system comprising an industrial plant, a programmable logic controller, and a cloud server, wherein

- the programmable logic controller is configured to establish a connection with the cloud server,
- the programmable logic controller is configured to execute a software module that causes the creation and/or configuration of a virtual machine on the cloud server,
- the software module is configured to receive and to store an access token,
- the programmable logic controller is configured to use the access token to access the virtual machine,
- the programmable logic controller is configured to cooperate with the virtual machine in order to transmit process data to the virtual machine and/or to support the control of the industrial plant.

The statements on the method in accordance with the invention apply accordingly to the system in accordance with the invention. This in particular applies with respect to advantages and embodiments. It is understood that all the embodiments mentioned herein can be combined with one another, unless explicitly stated otherwise.

The invention will be explained schematically and by way of example in the following with reference to the drawing. There is shown FIG. 1 an exemplary architecture of a network system with a programmable logic controller and a cloud server.

FIG. 1 shows, by way of example, the architecture of a network 10 that has a programmable logic controller 11 and a cloud server that comprises a cloud 13 and a management unit 15. The components are each connected to the Internet and can communicate with one another in a protected manner via the Internet, wherein, in the present example, the cloud 13 and the management unit 15 are likewise two separate units connected to one another and communicating with one another via the Internet. Alternatively, however, it is also conceivable that the cloud 13 and the management unit 15 are provided in a single physical unit.

The programmable logic controller 11 is part of an industrial plant (not shown) and comprises a gateway 17. Furthermore, the programmable logic controller 11 has an IIoT client 19 (Industrial Internet of Things). The IIoT Client 19 is a software module that is based on the IEC 61131 standard for programmable logic controllers and is integrated into a software library.

The management unit 15 has an API 21 (application programming interface) via which data can be retrieved and managed using a management client 23. In the present embodiment, the API 21 is accessed via an API endpoint by means of http and GraphQI requests and mutations.

In the method in accordance with the invention, a software module that runs on the programmable logic controller 11 and that is invoked via the IIoT client 19 has the effect that a virtual machine is created and configured on the cloud server.

For this purpose, a corresponding request is sent from the IIoT client 19 to the API 21. The request can, for example, include basic data about the virtual machine to be created which the user previously determined by means of the IIoT client 19, for instance, a designation, a client, and/or a plant type of the industrial plant. Furthermore, the user can specify at the IIoT client 19 whether the virtual machine should be fully automatically created by the programmable logic controller 11. In addition, it can be possible to communicate via the IIoT client 19 whether the creation should be partly or fully outsourced to the management unit 15 or whether certain configuration parameters for the virtual machine should be obtained from the management unit 15.

Based on the request, the virtual machine is created and automatically configured. To configure the virtual machine, configuration parameters are accessed that, for example, result from the data determined in the IIoT client 19, i.e., in the present example, the client or the plant type.

Then, an access token in the form of an SAS token (SAS for Shared Access Signatures) is communicated to the programmable logic controller 11 by the management unit 15 and is then stored. With the SAS token, the programmable logic controller 11 then regularly transmits plant data, which are provided with a time stamp and which in particular provide information about the performance of the industrial plant, to the cloud 13, where they are stored. Based on the SAS token, it can be checked in this respect whether the programmable logic controller 11 has the necessary authorizations to transmit the data to the cloud.

For security reasons, it is recommended to regularly renew the SAS token that has a limited validity anyway. The renewing and resending to the programmable logic controller 11 then takes place at the request of the IIoT client 19. In general, it would, however, also be conceivable to renew the SAS token automatically after a certain time lapse without requiring a request by the programmable logic controller 11.

The programmable logic controller 11 furthermore cooperates with the created virtual machine to support the control of the industrial plant. For example, computationally expensive or memory-intensive tasks can be taken over by the virtual machine to improve the control of the industrial plant.

Via the client 23, data on the industrial plant can then be retrieved and graphically processed. For this purpose, the data are requested in the cloud 13, are transmitted to the management unit 15 with the respective time stamp and are processed for viewing or evaluation by means of the client 23. Furthermore, configuration parameters can be added or adapted via the client 23.

The communication between the programmable logic controller 11 and the cloud server and to the API 21 takes place in encrypted form by means of TLS with an exchange of mutual certificates (X.509) when establishing the connection. In the present example, the communication is based on HTTPS.

A "bearer token" is assigned to the programmable logic controller 11 to secure the communication. This also has the effect that the programmable logic controller 11 can only access the data relevant to it in the management unit 15. The bearer token is, for example, stored during the putting into operation of the industrial plant or of the programmable logic controller 11.

REFERENCE NUMERAL LIST

10 network
11 programmable logic controller
13 cloud
15 management unit
17 gateway
19 IIoT client
21 API
23 management client

The invention claimed is:

1. A method for controlling an industrial plant comprising a programmable logic controller, in which the programmable logic controller establishes a connection with a cloud server, the programmable logic controller executes a software module that causes the creation and/or configuration of a virtual machine on the cloud server, the software module receives and stores an access token, the programmable logic controller uses the access token to access the virtual machine, the programmable logic controller cooperates with the virtual machine to transmit process data to the virtual machine and/or to support the control of the industrial plant, wherein the cloud server has a cloud for the virtual machine and a management unit, wherein the software module and/or the management unit creates/create the virtual machine on the cloud server, and the virtual machine is configured during the creation, wherein the configuration parameters are provided by the programmable logic controller and/or by the management unit.

2. The method in accordance with claim 1, wherein the management unit communicates the access token to the programmable logic controller and/or the virtual machine.

3. The method in accordance with claim 2, wherein the communication of the access token by the management unit takes place at the request of the programmable logic controller.

4. The method in accordance with claim 1, wherein the access token is received and stored repeatedly.

5. The method in accordance with claim 4, wherein the access token is received and stored regularly.

6. The method in accordance with claim 1, wherein the management unit initiates the creation and configuration of the virtual machine and communicates with the cloud and the programmable logic controller for this purpose, wherein the management unit receives the request from the programmable logic controller to create the virtual machine for the programmable logic controller, wherein the programmable logic controller transmits at least a basic configuration and/or basic requirements for the virtual machine to be created to the management unit, wherein, based on the basic configuration and/or the basic requirements, the configuration parameters required for creating the virtual machine are generated in the management unit.

7. The method in accordance with claim 6, wherein the configuration parameters are automatically generated in the management unit.

8. The method in accordance with claim 1, wherein the communication between the programmable logic controller and the cloud server takes place in encrypted form.

9. The method in accordance with claim 1, wherein the programmable logic controller transmits plant data about the industrial plant to the cloud.

10. A system comprising an industrial plant, a programmable logic controller, and a cloud server, wherein the programmable logic controller is configured to establish a connection with the cloud server, the programmable logic controller is configured to execute a software module that causes the creation and/or configuration of a virtual machine on the cloud server, the software module is configured to receive and to store an access token, the programmable logic controller is configured to use the access token to access the virtual machine, the programmable logic controller is configured to cooperate with the virtual machine in order to transmit process data to the virtual machine and/or to support the control of the industrial plant, wherein the cloud server has a cloud for the virtual machine and a management unit, wherein the software module and/or the management unit creates/create the virtual machine on the cloud server, and the virtual machine is configured during the creation, wherein the configuration parameters are provided by the programmable logic controller and/or by the management unit.

* * * * *